(12) United States Patent  (10) Patent No.: US 7,849,604 B2
McIntosh et al.                (45) Date of Patent:  Dec. 14, 2010

(54) HAND-HELD BAND SAW

(75) Inventors: Scott A. McIntosh, Commerce, MI (US); Ronald Shrin, Helena, AL (US); John Wate, Holly, MI (US)

(73) Assignee: Stout Tool Corp., Redford, MI (US)

( * ) Notice: Subject to any disclaimer, the term of this patent is extended or adjusted under 35 U.S.C. 154(b) by 245 days.

(21) Appl. No.: 12/122,207

(22) Filed: May 16, 2008

(65) Prior Publication Data

US 2008/0282556 A1  Nov. 20, 2008

Related U.S. Application Data

(60) Provisional application No. 60/930,502, filed on May 16, 2007.

(51) Int. Cl.
  *B23D 53/12*  (2006.01)
(52) U.S. Cl. .......................... 30/380; 83/810
(58) Field of Classification Search .................. 30/380; 83/810–812, 820; D8/64
  See application file for complete search history.

(56) References Cited

U.S. PATENT DOCUMENTS

| | | | | | |
|---|---|---|---|---|---|
| 1,303,809 | A | * | 5/1919 | Lofgren | 30/380 |
| 1,453,335 | A | * | 5/1923 | Bennett | 30/380 |
| 1,530,682 | A | * | 3/1925 | Lyman | 83/523 |
| 2,596,081 | A | * | 5/1952 | Sacrey | 30/380 |
| 2,722,953 | A | * | 11/1955 | Lee | 30/373 |
| 3,658,102 | A | | 4/1972 | Joosten | |
| 3,952,622 | A | | 4/1976 | Majus | 83/799 |
| 4,001,937 | A | * | 1/1977 | Stelljes et al. | 30/380 |
| 4,242,798 | A | | 1/1981 | Wikoff | |
| 4,823,666 | A | | 4/1989 | Galloway | 83/788 |
| 7,287,454 | B2 | * | 10/2007 | McIntosh | 83/788 |
| 2006/0260458 | A1 | | 11/2006 | Friend | |
| 2008/0271327 | A1 | * | 11/2008 | Glynn | 30/509 |

FOREIGN PATENT DOCUMENTS

JP  11-221715  8/1999

OTHER PUBLICATIONS

International Search Report with Written Opinion dated Jul. 18, 2008, from the corresponding International Patent Application No. PCT/US2008/063903.

* cited by examiner

*Primary Examiner*—Kenneth E. Peterson
(74) *Attorney, Agent, or Firm*—Young Basile

(57) ABSTRACT

A powered hand-held band for cutting a work piece and a method for manufacture and use. The band saw includes alternate blade guides respectively for selectively using one of a first cutting path for cutting a work piece flush with respect to a work surface and a second cutting path for non-flush cuts.

11 Claims, 3 Drawing Sheets

HAND-HELD BAND SAW

CROSS-REFERENCE TO RELATED APPLICATION

This application claims the benefit of Provisional Patent Application Ser. No. 60/930,502 filed on May 16, 2007.

FIELD OF THE INVENTION

This invention relates to a hand-held band saw for cutting work pieces, and more particularly a hand-held band saw and method for cutting a work piece flush with a surface.

BACKGROUND

Vertical band saws are commonly used tools for cutting conduits, pipes, and a variety of other objects. However, vertical band saws are large and difficult to transport. As a result, hand-held band saws were developed for use on remote job sites by electricians, pipe fitters, carpenters and other trade persons.

Known hand-held band saws include a saw blade that circulates around two wheels coupled to a frame. The saw blade is guided along a path interior to an outer surface of the frame parallel to the blade.

SUMMARY

The present invention provides a hand-held band saw capable of flushly cutting a work piece angularly extending from a work surface using a closed loop saw blade circulatable about a blade travel path. In one example of the invention, the band saw includes a frame housing the saw blade and at least partially defining the blade travel path and a cutting guide surface. A motor is connected to the frame and engaged with the saw blade to circulate the saw blade along the blade travel path. At least one first blade guide is connected to the frame for guiding the saw blade along a first cutting path portion of the blade travel path, with the first cutting path providing for a substantially flush cut of the work piece with respect to the work surface.

In another example, a drive motor is connected to the frame. A drive pulley is rotatably connected to the motor and engaged with the blade. The drive pulley partially defines the blade travel path. At least one first blade guide is connected to the frame and positioned along the blade travel path adjacent the cutting guide surface. The first blade guide defines a first blade cutting path portion of the blade travel path, and the first cutting path provides for a substantially flush cut of the work piece with respect to the work surface.

In a third example, the saw includes a frame defining a substantially planar cutting guide surface and a channel extending inwardly from a side of the frame including the cutting guide surface. A drive motor is connected to the frame. A drive pulley is rotatably connected to the motor and engaged with the blade, and the drive pulley partially defines the blade travel path. An idler pulley is rotatably connected to the frame on an opposing side of the channel from the drive pulley, and the idler pulley is engaged with the blade and partially defines the blade travel path. A tension adjusting handle is attached to the frame and coupled to the idler pulley for adjusting the tension of the blade. A handle is attached to the frame at an oblique angle adjacent the channel. A first pair of blade guides is connected to the frame on opposing sides of the channel adjacent the cutting guide surface. Each of the first pair of blade guides has a single, continuous blade guiding surface, and the blade guiding surfaces jointly define a first blade cutting path portion of the blade travel path. The first blade cutting path is coplanar with the cutting guide surface of the frame. A second pair of blade guides is connected to the frame on opposing sides of the channel adjacent the first pair of blade guides. The second pair of blade guides jointly defines a second blade cutting path portion of the blade travel path. The second blade cutting path is angled relative to the first blade cutting path. The band saw blade is selectively engaged with one of the first and second pairs of blade guides for being guided along one of the first and the second cutting blade paths for selective flush or non-flush cutting of the work piece with respect to the work surface.

In one example of a method of manufacturing the hand held band saw, a frame is provided with a power source and a motor for rotating a closed-loop saw blade. A first guide is connected to the frame providing a first cutting path for the blade which positions the blade so that a flush cut of a work piece with respect to a work surface, for example a vertical wall or horizontal floor, can be achieved.

In one example of a method of using the hand held band saw, a band saw is provided with a first blade guide which positions the blade along a first cutting path which is substantially planar to a cutting guide surface defined by the frame and a work surface. A second blade guide is provided for selectively positioning the blade along a second cutting path for non-flush cutting of a work piece with respect to the work surface. On selection of the type of cut and either of the first or the second blade cutting paths, the band saw is positioned with respect to the work surface such that the cutting guide surface rests on the substantially planar work surface thereby positioning the saw blade substantially planar with the work surface adjacent the work piece to be cut. The saw motor is engaged and the blade is urged in contact with the work piece to cut the work piece substantially flush with the work surface.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
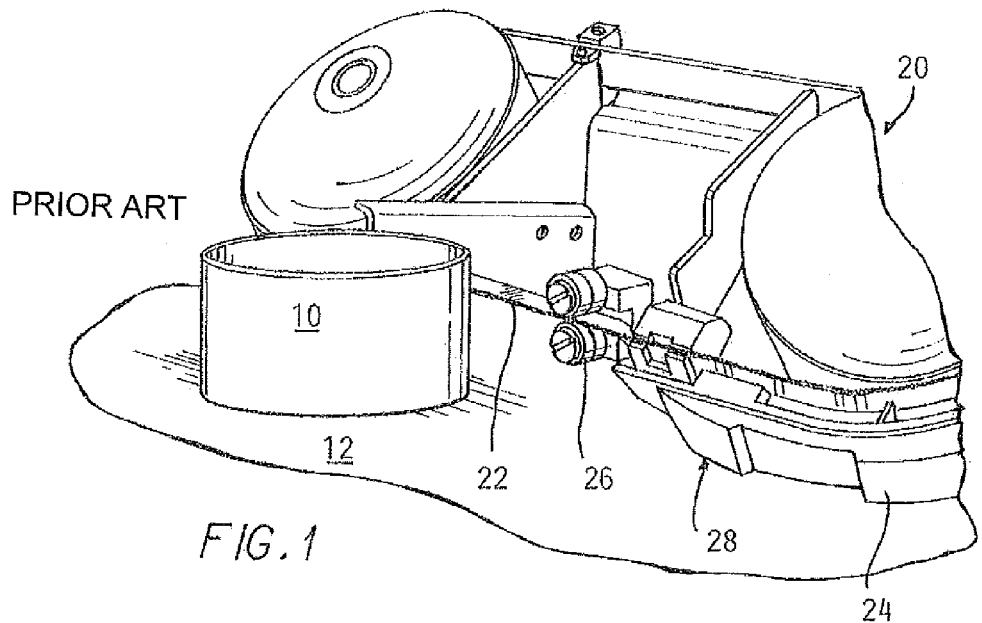
FIG. 1 is a partial perspective view of a known band saw positioned to cut a work piece projecting from a generally planar surface.

As illustrated in FIG. 1, known hand-held band saws 20 are typically configured and oriented to cut a work piece 10 projecting from a work surface 12. A saw blade 22 is spaced apart from the work surface 12 because of the position of the saw blade 22 relative to a frame 24 of the band saw 20. As shown, blade guides 26 on the known hand-held band saw 20 position the blade 22 above or inward of a guiding side 28 of the frame 24 used to abut the work surface 12. Since the blade 22 is inward of and non-planar to the work surface 12, these known hand-held band saws 20 are not configured to effectively and efficiently cut the work piece 10 flush with the work surface 12.

Figure 2:
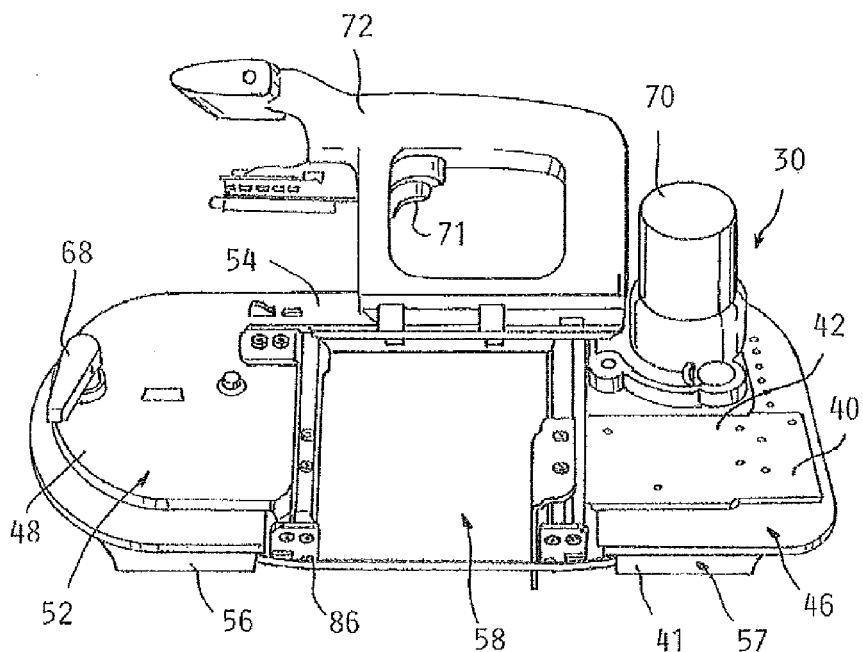
FIG. 2 is a perspective view of an example of the inventive hand-held band saw having a saw blade positioned to make a flush cut.
Figure 3:
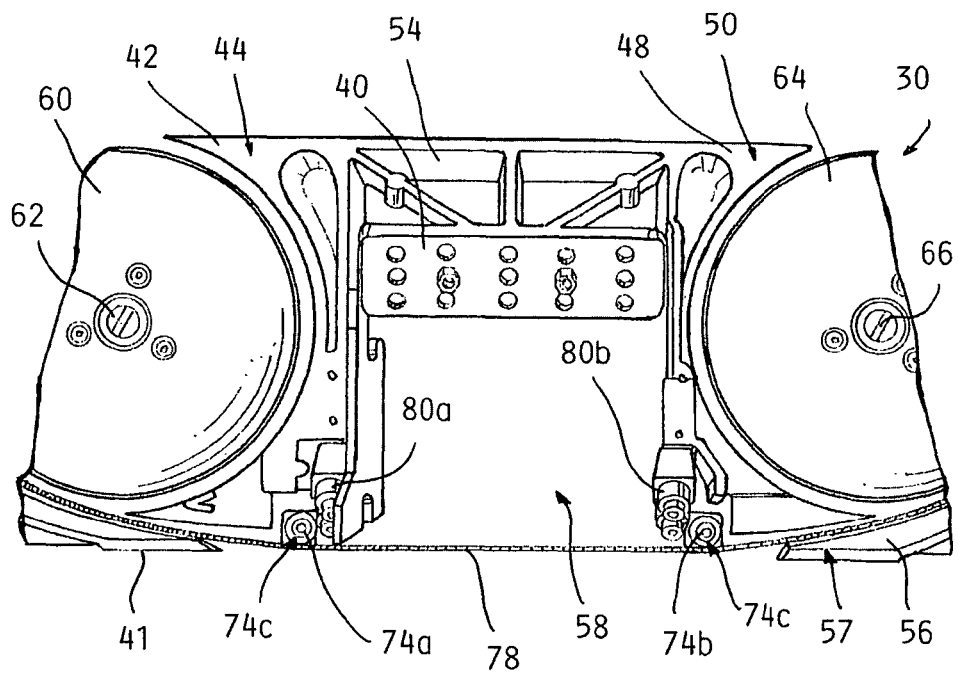
FIG. 3 is a partial bottom view of the hand-held band saw of FIG. 2.

FIGS. 2-6 illustrate examples of a band saw 30 according to the present invention. Referring to FIG. 2, the band saw 30 includes a frame 40 having a drive pulley deck 42, an idler pulley deck 48 generally coplanar with the drive pulley deck 42, and a connecting portion 54 connecting the drive pulley deck 42 to the idler pulley deck 48. The drive pulley deck 42 includes a motor side 46 visible in FIG. 2 and a drive pulley side 44 opposite the motor mounting side 46 as best seen in FIG. 3. The idler pulley deck 48 includes a tensioning handle side 52 and an idler pulling side 50 opposite the tensioning handle side 52.

Figure 6:
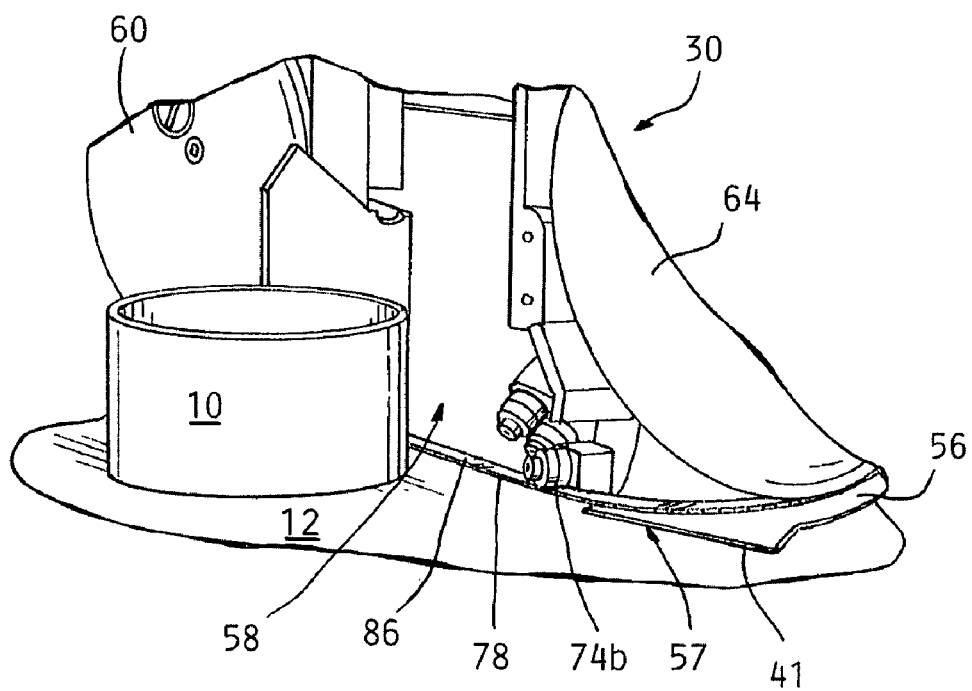
FIG. 6 is a partial perspective view of the hand-held band saw of FIG. 2 positioned to flushly cut a work piece.

As shown in FIG. 2, a protective flange 56 depends substantially normally from the drive pulley deck 42 and the idler pulley deck 48. Preferably, the protective flange 56 extends around the outer perimeter of the drive pulley deck 42, the connecting portion 54, and the idler pulley deck 48. The flange 56 can include a guide surface 57 to provide stability when the band saw 30 is positioned against the work surface 12 as shown in FIG. 6.

Referring to FIG. 2, the frame 40 defines a channel 58 between the drive pulley deck 42 and the idler pulley deck 48. The channel 58 extends inwardly from a cutting side 41 of the frame toward the connecting portion 54, and the channel 58 extends between the drive pulley deck 42 and the idler pulley deck 48. The channel 58 is dimensioned to accept work pieces 10 up to a predetermined size. Both the frame 40 and channel 58 can be made larger or smaller to accommodate work pieces 10 of various sizes.

FIG. 3 illustrates an example of the underside of the band saw 30. A drive pulley 60 is rotatably coupled about a drive pulley axis 62 to the drive pulley mounting side 44 of the drive pulley deck 42, and an idler pulley 64 is rotatably coupled about an idler pulley axis 66 to the idler pulley mounting side 50 of the idler pulley deck 48. As illustrated, the drive pulley axis 62 and the idler pulley axis 66 are parallel. However, the drive pulley 60 and idler pulley 64 can alternatively be mounted to the frame for rotation about obliquely angled axes. In an alternative example, the frame 40 can include more pulleys (not shown) in addition to the drive pulley 60 and idler pulley 64 depending on the configuration of the band saw 30.

Referring back to FIG. 2, a tension adjusting handle 68 is coupled to the tensioning handle side 52 of the idler pulley deck 48. The tension adjusting handle 68 can be used to adjust the position of the idler pulley 64 by moving the idler pulley 64 in a direction transverse to the idler pulley axis 66. It is understood that the tension adjusting handle 68 can be attached at another location on the band saw 30 to effectively increase or decrease the tensions in the blade 86 as desired. It is further understood that a different mechanism can be used for adjusting the position of the idler pulley 64 if desired.

A motor 70 is attached to the motor mounting side 46 of the drive pulley deck 42. The motor 70 rotatably drives the drive pulley 60 around the drive pulley axis 62. Alternatively, the motor 70 can be attached at another location on the band saw 30 to drive the drive pulley 60 or otherwise rotate the blade 86. The motor 70 is driven by a battery pack (not shown) attached to the band saw 30 in electrical connection with the motor 70. Other means for powering motor 70, for example an outlet plug-in power cord, may be used.

A handle 72 is attached to the frame 40 adjacent the connecting portion 54. The handle 72 is angled obliquely relative to the motor mounting side 46 of the drive pulley deck 42. Alternatively, the handle 72 can be attached to the frame 40 at another location and can be angled at a different angle than shown.

FIG. 3 illustrates a first pair of blade guides 74a and 74b attached to the frame 40 on opposing sides of the channel 58. Each blade guide 74a and 74b has an outer blade contact surface 74c which defines a first cutting path 78 between the blade guide contact surfaces 74c. The first cutting path 78 is parallel with the guide surface 57 of the flange 56. In a preferred example shown in FIGS. 3 and 6, the first cutting path is substantially coplanar with the guide surface 57. Alternatively, the blade guides 74a and 74b can be positioned further outward away from the cutting side 41. In other words, the blade guides 74a and 74b can be positioned such that the first cutting path 78 is substantially parallel, but not coplanar, with the guide surface 57. If the blade guides 74a and 74b are positioned further outward, the cutting plane 78 need not be coplanar with the surface 57 for the band saw 30 to be capable of making flush cuts.

Figure 4:
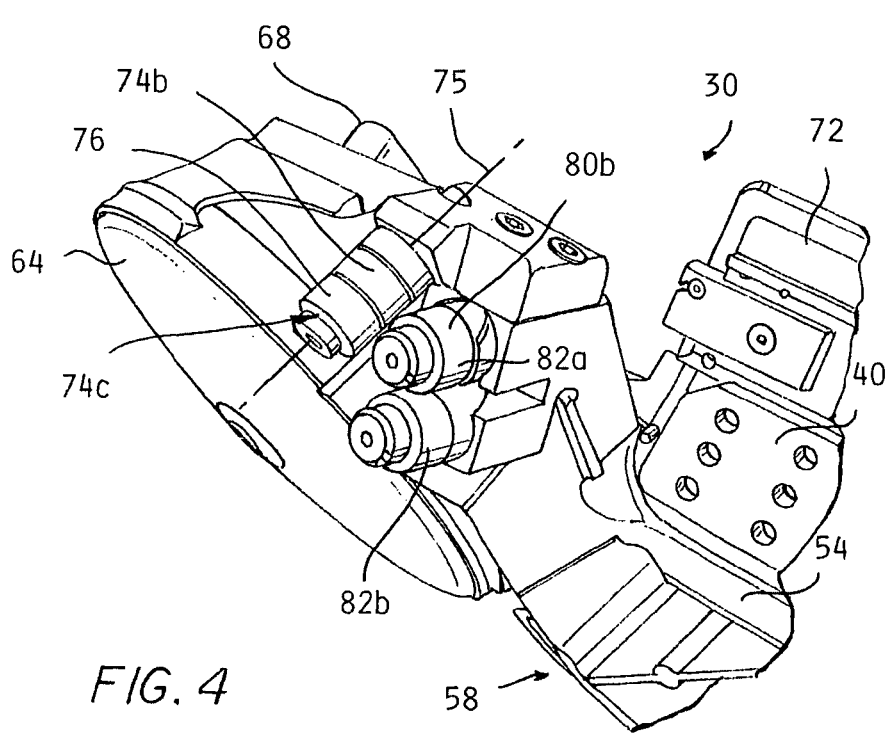
FIG. 4 is a partial and enlarged perspective view of one of the blade guides of FIG. 2 without a saw blade for illustrative purposes.
Figure 5:
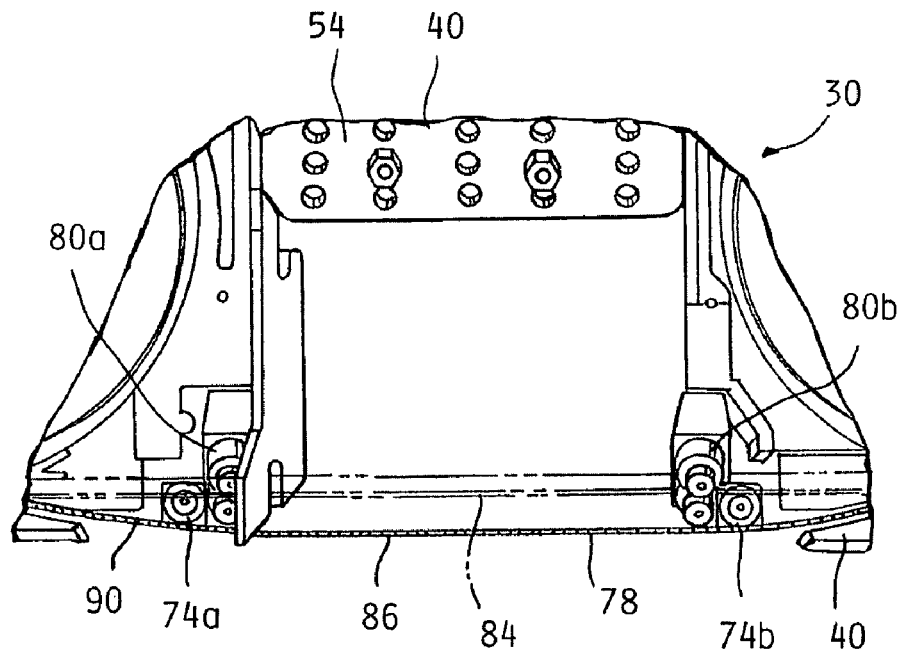
FIG. 5 is a partial and enlarged bottom view of the hand-held band saw of FIG. 2.

FIG. 4 illustrates a close-up of the first blade guide 74b on the idler pulley 64 side of the channel 58. The blade guide 74b includes a roller bearing 76 rotatably coupled to the frame 40. The roller bearing 76 rotates about a roller bearing axis 75 parallel to the drive pulley axis 62. Alternatively, the blade guides 74a and 74b may be non-rotatable guiding surfaces, such as wear plates. Also, the roller bearing axis 75 need not be parallel with the drive pulley axis 62, as the blade guides 74a and 74b may be configured to twist the blade 86 as desired between the drive pulley 60 and idler pulley 64 and the blade guides 74a and 74b, respectively, if the axes 62 and 75 are obliquely angled. Further, blade guide 74a can have the same structure as blade guide 74b, or the two blade guides 74a and 74b can have different structures for effectively guiding the blade 86 along the first cutting path 78.

Referring back to FIG. 3, the band saw 30 can also include a second pair of blade guides 80a and 80b similar to conventional blade guides 26 as illustrated in FIG. 1. Blade guides 80a and 80b are attached to the frame 40 on opposing sides of the channel 58. The blade guides 80a and 80b define a second cutting path 84 (shown in phantom line in FIG. 5) positioned inward toward the frame 40 and obliquely angled to the first cutting path 78. As shown in FIG. 4, in one example the blade guide 80b includes two roller guiding portions 82a and 82b, each of which includes a roller bearing 76. The guiding portions 82a and 82b are rotatably coupled to the frame 40 about parallel axes, and the portions 82a and 82b are slightly spaced apart. Alternatively, the blade guides 80a and 80b can consist of non-rotatable guiding surfaces, such as wear plates. Similarly, the blade guides 80a and 80b need not include two guiding portions 82a and 82b, though the use of two guiding portions 82a and 82b is preferred for retaining both sides of the blade 86 for guidance along the second cutting path 84.

In one example of a method of manufacture, operation and use, the blade 86 is installed by moving the idler pulley 64 to a low-tension blade position using the tension adjusting handle 68. The blade 86 is then positioned around both the drive pulley 60 and the idler pulley 64 and engaged with either the first pair of blade guides 74a and 74b or the second pair of blade guides 80a and 80b. Then, the tension adjusting handle 68 is used to move the idler pulley 64 to a higher tension position suitable for the selected guides 74 or 80 and cutting application. Where a work piece 10, for example a pipe, I-beam, floor joist or vertical pole, is desired to be cut flush to the work surface 12, for example a vertical wall or a horizontal floor, the first guides 74a and 74b would selectively be used. Where a flush cut is not necessary or desired, the second guides 80a and 80b may selectively be used.

When a trigger 71 (shown in FIG. 1) is depressed, the battery or other power source provides electricity to the motor 70 causing the motor 70 to rotate. The rotation of the motor 70 drives the drive pulley 60, which in turn causes the blade 86 to circulate along a blade travel path 90 partially shown in FIG. 5 that encompasses both pulleys 60 and 64 and the selected pair of blade guides 74 or 80, depending on the desired cut. The blade travel path 90 includes the first cutting path 78 or the second cutting path 84 between the blade guides 74 or 80, respectively. The band saw 30 is positioned such that the channel 58 is aligned with the work piece 10, then the band saw 30 or work piece 10 is moved such that the blade 86 contacts the work piece 10. In an alternate example, the frame cutting surface 57 is aligned and laid to rest on the work surface to provide stability for the saw and the saw blade. As the blade 86 cuts through the work piece 10, the cut portion of the work piece 10 enters the channel 58. Relative movement of the band saw 30 with respect to work piece 10 continues until a desired amount of the work piece 10 is cut.

To cut the work piece 10 at a position substantially flush with the work surface 12, the blade is selectively engaged or positioned with the first pair of blade guides 74a and 74b and the band saw is oriented as shown in FIG. 6. Since the blade 86 is substantially coplanar with the surface 57 of the frame 40, the blade 86 abuts the surface 12 when the frame 40 is positioned with the surface 57 abutting the generally planar surface 12. Thus, when the blade 86 is engaged with the first pair of blade guides 74a and 74b, the blade is substantially coplanar with the surface 57 and the work surface 12 allowing for a flush cut of the work piece 10 with respect to the work surface 12.

In alternate examples, the blade guides 74a and 74b can have alternate structures from the above description. For example, instead of two sets of blade guides 74 and 80, blade guides 80a and 80b can be arranged such that the guide portion 82b of each blade guide 80a and 80b is positioned to function as a blade guides 74a or 74b, with the blade 86 movable from between the guide portions 82a and 82b for regular, non-flush cutting to being positioned on the outside of guide portions 82b for flush cutting. Similarly, instead of two sets of blade guides 74 and 80, the blade guides 80a and 80b can have an adjustable position, and the guide portions 82a can be removable such that guide portions 82b function as blade guides 74a and 74b. As another example, blade guides 74 and 80 can be detachable from the frame 40, with one of the pairs of blade guides 74 or 80 attached at a time depending on the desired cutting function.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A powered hand-held band saw for use in cutting a work piece angularly extending from a substantially planar work surface, the saw having a closed-loop saw blade circulatable about a blade travel path, the saw comprising:
   a frame housing the saw blade and at least partially defining the blade travel path and a cutting guide surface;
   a motor connected to the frame and engaged with the saw blade to circulate the saw blade along the blade travel path between a drive pulley and an idler pulley, said drive pulley having an axis; and
   at least one first blade guide connected to the frame between the drive pulley axis and an idler pulley axis for guiding the saw blade along a first cutting path portion of the blade travel path, the first cutting path having the blade width oriented substantially parallel to the drive pulley axis for providing for a substantially flush cut of the work piece with respect to the work surface,
   further comprising at least one second blade guide connected to the frame between the drive pulley axis and idler pulley axis for guiding the saw blade along a second cutting path portion of the blade travel path, the second cutting path positioned inward of the frame cutting guide surface with respect to the first cutting path, the second cutting path having the blade width oriented obliquely relative to the drive pulley axis providing for a non-flush cut of the work piece with respect to the work surface,
   wherein the saw blade is selectively positionable along one of the first and the second cutting blade paths for selective flush or non-flush cutting of the work piece with respect to the work surface.

2. The band saw of claim 1, wherein the first cutting path is substantially planar to the frame cutting guide surface.

3. The band saw of claim 1, wherein the first blade guide comprises a pair of blade guides separated from each other along the first cutting path.

4. The band saw of claim 3, wherein the frame defines a channel positioned between the respective first blade guides along the first cutting path.

5. The band saw of claim 1, wherein the second blade guide comprises a pair of blade guides separated from each other along the second cutting path, the second blade guides positioned so that the second cutting path is angularly displaced with respect to the first cutting path.

6. A powered hand-held band saw for use in cutting a work piece angularly extending from a substantially planar work surface, the saw having a closed-loop saw blade circulatable about a blade travel path, the saw comprising:
   a frame defining a substantially planar cutting guide surface; a drive motor connected to the frame;
   a drive pulley rotatably connected to the motor and engaged with the saw blade, the drive pulley and an idler pulley partially defining the blade travel path, said drive pulley having an axis;
   at least one first blade guide connected to the frame between the drive pulley axis and the idler pulley axis and positioned along the blade travel path adjacent the cutting guide surface, the first blade guide defining a first blade cutting path portion of the blade travel path, wherein the first cutting path having the blade width oriented substantially parallel to the drive pulley axis for providing for a substantially flush cut of the work piece with respect to the work surface,
   further comprising at least one second blade guide connected to the frame between the drive pulley axis and idler pulley axis for guiding the saw blade along a second cutting path portion of the blade travel path, the second cutting path positioned inward of the frame cutting guide surface with respect to the first cutting path, the second cutting path having the blade width oriented obliquely relative to the drive pulley axis providing for a non-flush cut of the work piece with respect to the work surface,
   wherein the saw blade is selectively positionable along one of the first and the second cutting blade paths for selective flush or non-flush cutting of the work piece with respect to the work surface.

7. The band saw of claim 6, wherein the second blade guide comprises a pair of blade guides separated from each other along the second cutting path, the second blade guides positioned so that the second cutting path is angularly displaced with respect to the first cutting path.

8. The band saw of claim 6, wherein the frame defines a channel extending inward between the drive pulley and the idler pulley from a side of the frame including the cutting guide surface; and wherein the first blade cutting path spans the channel.

9. The band saw of claim 6, wherein the first cutting path is substantially planar to the frame cutting guide surface.

10. The band saw of claim 6, wherein the first blade guide comprises a pair of blade guides separated from each other along the first cutting path.

11. The band saw of claim 10, wherein each of the pair of blade guides includes a single, continuous blade guiding surface.

* * * * *